US010761918B2

(12) United States Patent
Prasad et al.

(10) Patent No.: US 10,761,918 B2
(45) Date of Patent: Sep. 1, 2020

(54) METHOD TO HANDLE CORRECTED MEMORY ERRORS ON KERNEL TEXT

(71) Applicant: International Business Machines Corporation, Armonk, NY (US)

(72) Inventors: Aravinda Prasad, Mysore (IN); Mahesh J. Salgaonkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 15/955,747

(22) Filed: Apr. 18, 2018

(65) Prior Publication Data

US 2019/0324830 A1 Oct. 24, 2019

(51) Int. Cl.
| | | |
|---|---|---|
| *G06F 11/07* | (2006.01) | |
| *G06F 11/10* | (2006.01) | |
| *G06F 9/54* | (2006.01) | |
| *G06F 9/455* | (2018.01) | |
| *G06F 9/30* | (2018.01) | |

(52) U.S. Cl.
CPC ........ *G06F 11/073* (2013.01); *G06F 9/30058* (2013.01); *G06F 9/45558* (2013.01); *G06F 9/545* (2013.01); *G06F 11/0793* (2013.01); *G06F 11/1048* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 5,873,124 A | * | 2/1999 | Draves | G06F 12/145 711/202 |
| 7,533,303 B2 | * | 5/2009 | Zeighami | G11C 7/1006 714/47.2 |
| 8,086,913 B2 | * | 12/2011 | Houg | G11C 29/76 714/710 |
| 8,443,261 B2 | | 5/2013 | Waldspurger et al. | |
| 9,299,457 B2 | | 3/2016 | Chun et al. | |

(Continued)

OTHER PUBLICATIONS

List of IBM Patents or Patent Applications Treated as Related, Apr. 6, 2020, 2 pgs.

(Continued)

*Primary Examiner* — Steve N Nguyen
(74) *Attorney, Agent, or Firm* — Robert J. Shatto

(57) ABSTRACT

Embodiments of the present invention facilitate handling corrected memory errors on kernel text. An example computer-implemented method includes identifying a correctable error (CE) in a physical error location of a memory and a kernel function impacted by the CE. The identified kernel function includes a plurality of instructions including a first instruction of the identified kernel function at a first physical memory location in a first region of the memory. The first region includes the physical error location. The plurality of instruction is loaded to a second region of the memory. The loading includes storing the first instruction of the identified kernel function at a second physical memory location in the second region of the memory. The first physical memory location in the first region of the memory is updated to include an instruction to branch to the second physical memory location in the second region of the memory.

19 Claims, 5 Drawing Sheets

(56) References Cited

U.S. PATENT DOCUMENTS

| | | | |
|---|---|---|---|
| 9,507,675 B2* | 11/2016 | Chun | G06F 11/1048 |
| 10,324,793 B2 | 6/2019 | Pangal et al. | |
| 2009/0132876 A1* | 5/2009 | Freking | G06F 11/106 |
| | | | 714/723 |
| 2009/0282300 A1* | 11/2009 | Heyrman | G06F 11/2082 |
| | | | 714/708 |
| 2012/0137168 A1* | 5/2012 | Lu | G06F 11/1666 |
| | | | 714/6.13 |
| 2012/0151252 A1* | 6/2012 | Harris | G06F 11/141 |
| | | | 714/6.13 |
| 2015/0199233 A1* | 7/2015 | Pelley | G06F 11/1076 |
| | | | 714/764 |
| 2016/0077939 A1 | 3/2016 | Prasad | |
| 2018/0246787 A1 | 8/2018 | Deligeon et al. | |
| 2019/0188092 A1 | 6/2019 | Prasad | |

OTHER PUBLICATIONS

Prasad et al., "Handling Asynchronous Memory Errors on Kernel Text," U.S. Appl. No. 16/788,501, filed Feb. 12, 2020.

* cited by examiner

METHOD TO HANDLE CORRECTED MEMORY ERRORS ON KERNEL TEXT

BACKGROUND

Embodiments of the present invention relate in general to computer memory, and more specifically to a method for handling corrected memory errors on kernel text.

Errors in dynamic random access memory (DRAM) are a common form of hardware failure in modern computer systems. A memory error is an event that leads to the corruption of one or more bits in the memory. Memory errors can be caused by electrical or magnetic interference (e.g., due to cosmic rays), can be due to problems with the hardware (e.g., a bit being permanently damaged), or due to corruption along the data path between the memory and the processing elements.

Most enterprise systems employ different mechanisms to recover from different types of memory errors. The recovery mechanism can be in the hardware or at the software level. At the hardware level, techniques that include error correcting codes (ECCs) are used to recover from single bit errors and some types of multi-bit errors. Hardware techniques cannot be used to recover from every type of memory error. For example, hardware techniques cannot recover from memory errors if the number of affected bits exceeds the ECC correctable limit of the particular ECC being implemented. Memory errors that are automatically detected and corrected by hardware are referred to as correctable errors (CEs). Memory errors that are detected by hardware but that cannot be corrected by hardware techniques are referred to as uncorrectable errors (UEs). UEs are passed on to the software (e.g., firmware, kernel) through a non-maskable interrupt signaling a non-recoverable hardware error in the system memory. Depending on the location of the UE, software employs different methods in an attempt to recover from the UE. Not all UEs can be recovered at the software level and an UE that cannot be recovered can lead to a system crash.

A strong correlation has been found to exist between CEs and UEs. A CE on a memory location can increase the probability of a future UE at the same memory location.

SUMMARY

Embodiments of the present invention include methods, systems, and computer program products for handling corrected memory errors on kernel text. A non-limiting example method includes identifying a correctable error (CE) in a physical error location of a memory. The method also includes identifying a kernel function impacted by the CE. The identified kernel function includes a plurality of instructions in a first region of the memory. The plurality of instructions includes a first instruction of the identified kernel function at a first physical memory location in the first region of the memory. The first region includes the physical error location. The plurality of instruction is loaded to a second region of the memory. The loading includes storing the first instruction of the identified kernel function at a second physical memory location in the second region of the memory. The first physical memory location in the first region of the memory is updated to include an instruction to branch to the second physical memory location in the second region of the memory. A request to access the identified kernel function at the first physical memory location subsequent to the loading and the updating is received. The first physical memory location is accessed and the instruction to branch to the second physical memory location is performed in response to receiving the request to access the identified kernel function at the first physical memory location.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
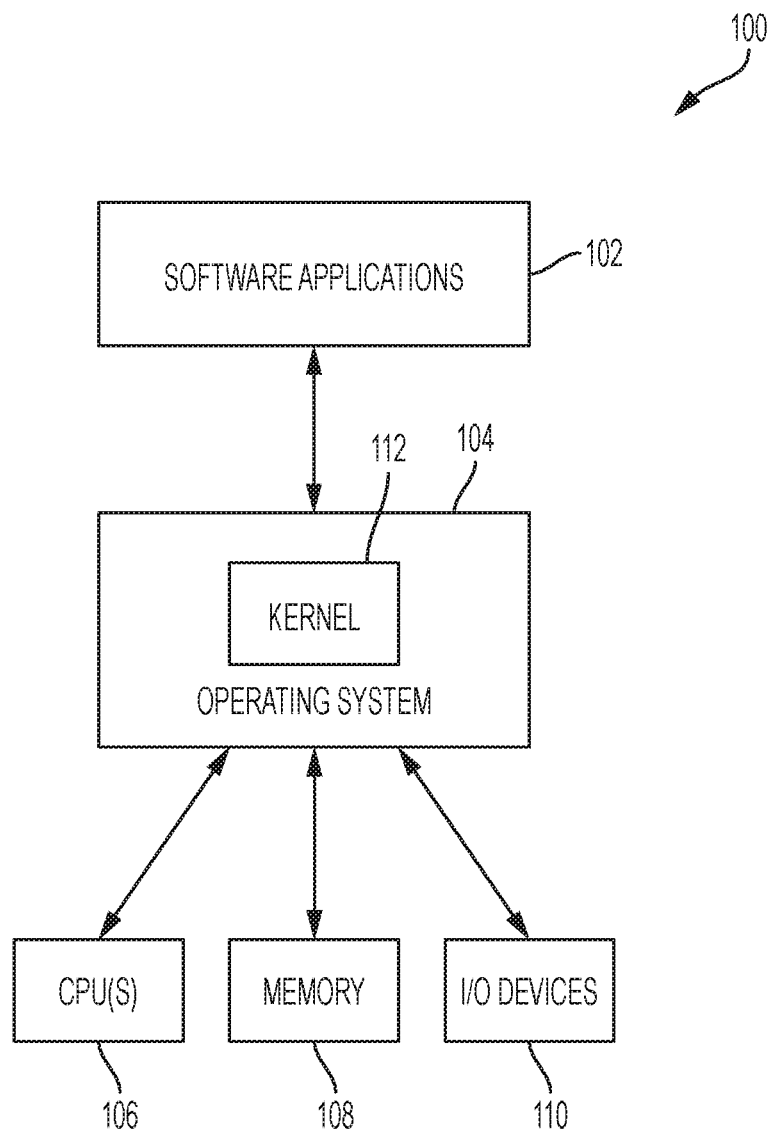
FIG. 1 depicts a system for handling corrected memory errors on kernel text in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Embodiments of the present invention provide a method for handling corrected memory errors on kernel text. In accordance with one or more embodiments of the present invention, upon a correctable error (CE) being detected in a portion of a memory containing kernel text, a kernel function in the kernel text that is impacted by the CE is identified, and a copy of the instructions of the impacted kernel function are loaded into a new memory location. In addition, the first instruction of the impacted function at the original location having the CE error is patched to branch to the new memory location containing the copy of the instructions of the impacted kernel function. In this manner, only the first memory location of the instructions in the impacted function will be utilized for any subsequent accesses to the kernel function. As long as the CE was not at the first memory location of the instructions of the impacted function, the kernel text address that encountered a CE will no longer be accessed, and thus the risk of an uncorrectable error (UE) in the kernel text is reduced.

Errors in dynamic random access memory (DRAM) devices can be a major concern in production environments, particularly when the memory errors cause system downtime. The ability to avoid potential UE errors as provided by exemplary embodiments of the present invention described herein can result in higher availability of systems due to a decrease in system outages caused by memory errors.

Memory errors can be classified as CEs which the hardware automatically corrects, and UEs which cannot be automatically corrected by the hardware. A CE on a memory region is often followed in the near future by an UE on the same memory region. Thus, an operating system (OS) may migrate the contents of a page that encountered a CE to a new page in order to avoid data corruption in the future due to an UE on the page. However, this approach of migrating a page is not possible for kernel text, as kernel text is mapped directly to physical memory in many OSs. In order to move a portion of the kernel text to a different physical memory location, the system must be rebooted and the kernel text mapping changed to a different physical memory location during the reboot.

As used herein, the term "region" refers to a portion of a physical memory and may include, but is not limited to: a single memory location, a page, multiple pages, a block, and multiple blocks.

It is noted that the memory is not corrupt when a CE is encountered, but that a CE is an indication that in the future this memory region may get corrupted beyond recovery. As described previously, existing techniques copy the contents of the memory to a new memory location whenever a CE is encountered. However, such techniques cannot be applied to kernel text as kernel text in many OSs such as, but not limited to Linux and Berkeley Software Distribution (BSD), are directly mapped to physical memory. In other words, the virtual address to physical address mapping is fixed for the kernel text and cannot be changed without rebooting. The motivation to directly map the kernel text to physical memory is to avoid the costly and performance-sensitive address translation overhead during kernel instruction fetch.

In contemporary systems, if a system encounters a CE on a kernel text, then it is an indication that an UE could soon occur on the kernel text. However, since the kernel text cannot be copied or migrated to a different physical memory location while the system is running, contemporary methods of handling CEs on kernel text involve marking the memory region as corrupt and rebooting the system in order to avoid a system outage due to a UE in the future. During system reboot, the kernel text is mapped to a different physical memory location. Rebooting a production system causes system downtime, and contemporary solutions that include rebooting the production system upon detecting a CE on a kernel text can have an impact on system availability.

Turning now to FIG. 1, a computer system 100 for handling corrected memory errors on kernel text is generally shown in accordance with one or more embodiments of the present invention. The computer system 100 shown in FIG. 1 includes software applications 102, OS 104 that includes a kernel 112, a central processing unit(s) (CPU) 106, a memory 108, and input/output (I/O) devices 110. The kernel 112 shown in FIG. 1 mediates access between the software applications 102 and computer resources that include CPU 106, memory 108, and I/O devices 110. As known in the art, the CPU 106 executes computer programs and the kernel 112 decides which of the software applications 102 at any given time should be allocated to the CPU(s) 106. The I/O devices 110 can include peripherals such as, but not limited to keyboards, mice, disk drives, network interfaces, printers, and display devices, and the kernel 112 allocates requests from the software application(s) 102 to the I/O devices 110.

The memory 108 shown in FIG. 1 can be implemented by any types of memory known in the art such as, but not limited to: dynamic random access memory (DRAM) and flash memory. The memory 108 can be used to store both software applications 102, or program instructions, and data. The kernel 112 can determine which memory each program can use at any given point in time and can implement virtual addressing to service the memory requests from the software applications 102. In one or more embodiments of the present invention, the kernel 112 interfaces to the memory 108 via a memory controller (not shown).

Implementations of the kernel 112 shown in FIG. 1 can include, but are not limited to: a Linux kernel, a hypervisor, and firmware. The computer instructions of kernel 112, referred to herein as "kernel text" can be loaded into a protected area of the memory 108, which prevents it from being overwritten by the software applications 102 or other parts of the OS 104.

Figure 2:
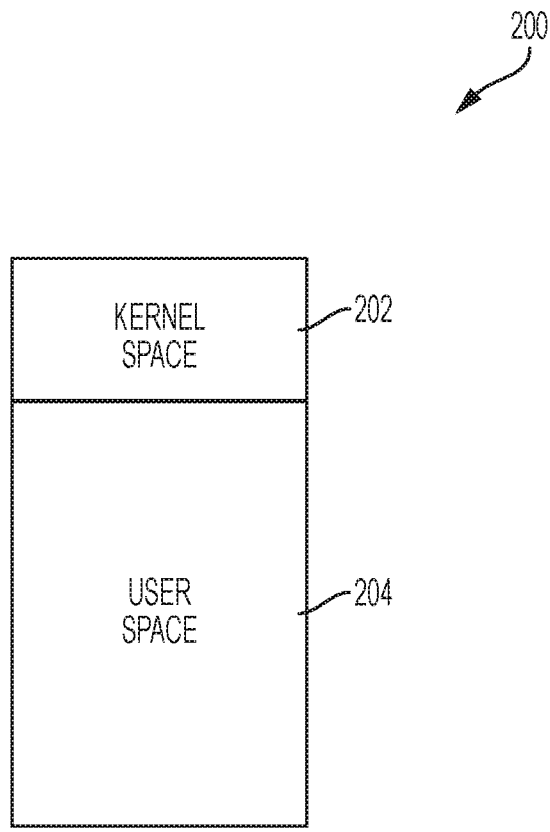
FIG. 2 depicts a memory in accordance with one or more embodiments of the present invention.

Turning now to FIG. 2, a memory 200 with defined kernel space 202 and user space 204 is generally shown in accordance with one or more embodiments of the present invention. The memory 200 shown in FIG. 2 can be implemented, for example, by memory 108 of FIG. 1. The memory shown in FIG. 2 includes kernel space 202 in a protected area (also referred to as "protected memory") of the memory for storing kernel text. The kernel text includes kernel functions such as, but not limited to: system calls; file system routines, and device drivers. The kernel functions in the kernel text are accessed by a kernel, such as kernel 112 of FIG. 1, using a virtual address that is directly mapped to a physical address in order to avoid the overhead of using tables to convert from a virtual address (or logical address) to a physical address when accessing the kernel functions. As used herein, the terms "logical address" and "virtual address" are used interchangeably to refer to a memory address which must be translated, or mapped, to a physical memory location, or physical address. Because each kernel function in the kernel space 202 is accessed by the kernel using a virtual address that is directly mapped to a physical address, the physical address of a particular kernel function can only be updated by rebooting the computer system. Direct mapping of a kernel address to a physical address can improve system performance as the overhead of conversion from physical to virtual address is avoided for the kernel text.

The user space 204 of the memory 200 can store application instructions and data, and the contents are controlled by the kernel using, for example, a virtual addressing scheme.

Figure 3:
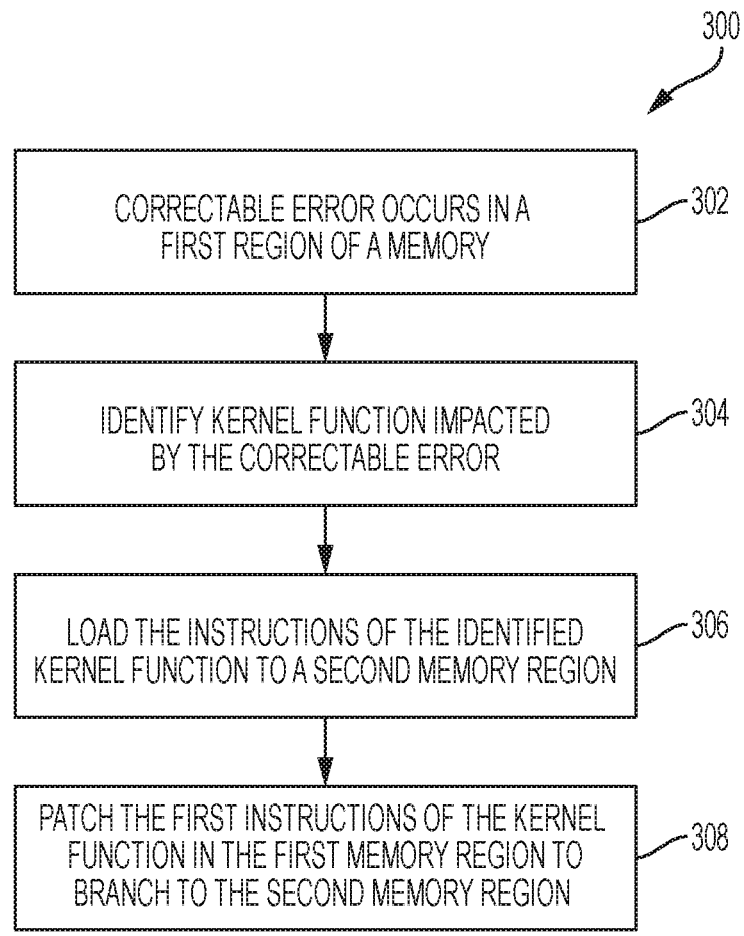
FIG. 3 is a flow diagram of a process for handling corrected memory errors on kernel text in accordance with one or more embodiments of the present invention.
Figure 4:
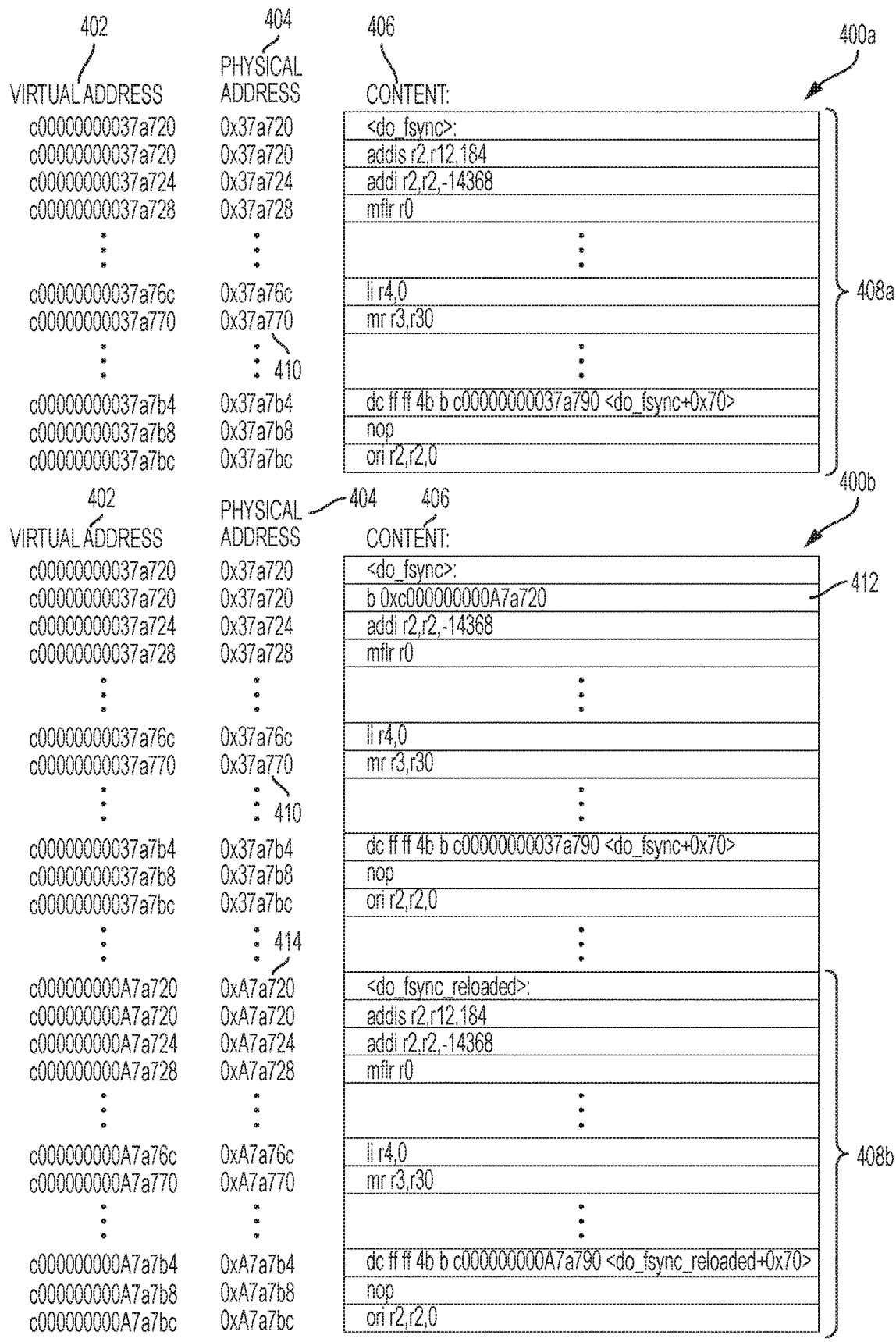
FIG. 4 depicts a block diagram of kernel text stored in a memory in accordance with one or more embodiments of the present invention.

Turning now to FIG. 3, a flow diagram 300 of a process for handling corrected memory errors on kernel text is generally shown in accordance with one or more embodiments of the present invention. The processing shown in FIG. 3 can be implemented, for example, by kernel 112 of FIG. 1. Turning now to FIG. 4, a block diagram of a virtual address 402, physical address 404, and content 406 of a memory that stores kernel text is generally shown in accordance with one or more embodiments of the present invention both prior to detecting a CE 400a and after detecting a CE 400b. The content 406 includes instructions 408 executed as part of a function labeled "do_fsync." The memory 400a 400b shown in FIG. 4 can be implemented, for example, by a portion of memory 108 of FIG. 1 or by a portion of kernel space 202 in memory 200 of FIG. 2.

As described previously, the occurrence of a CE at a memory location indicates an increased likelihood of a UE occurring at the same memory location. A CE can be corrected to allow the system to function normally, but only until it encounters an UE. Techniques such as migrating data to a different memory location upon detecting a CE and updating page table entries to reflect the new virtual address to physical address mapping can be used when virtual addresses are used to access the memory. In addition, the page in the memory which encountered the CE can be removed from the available pool of memory.

Migrating techniques cannot be applied when kernel text encounters a CE because the kernel text is directly mapped to the physical memory and changing the virtual address to physical address mapping of the kernel text is not possible. FIG. 4 depicts instructions 408a of a function in a Linux kernel where the virtual address 0xc00000000037a720 is directly mapped to physical address 0x37a720 (address translation is just masking the higher order bits of the virtual address and does not require a page table walk). Such a virtual address 402 to physical address 404 mapping cannot be changed without rebooting.

At block 302 of FIG. 3, a CE occurs at a physical location in a first region of a memory. The kernel is notified of the CE and the physical address of the CE. In the example shown in FIG. 4, physical memory location 0x37a770 410 is the location of the CE. In one or more embodiments of the present invention, the CE is detected by a memory controller (and the kernel is notified), using for example, an error correcting code (ECC) when content of the 406 of physical memory location 0x37a770 410 is read. In one or more embodiments of the present invention, the CE is detected (and the kernel is notified) by a processor such as CPU 106 in FIG. 1.

At block 304 of FIG. 3, the kernel function impacted by the CE is identified. In the example shown in FIG. 4, the do_fsync( ) function is identified as the kernel function impacted by the CE because content 406 of physical memory location 0x37a770 410 contains an instruction belonging to the function do_fsync( ). In accordance with one or more embodiments of the present invention, if it is determined that content 406 of the physical memory location that has the CE contains the first instruction of the function (e.g., 0x37a720 in FIG. 3), then contemporary methods of dealing with a CE in kernel text, which may include a reboot of the system, can be performed.

If the physical memory location that has the CE does not contain the first instruction of the function, then processing continues at block 306 of FIG. 3. At block 306, the instructions 408a of the impacted kernel function are loaded into a second memory region. In accordance with one or more embodiments of the present invention, a free physical memory region in the memory is identified. In accordance with one or more embodiments of the present invention, the free physical memory region is in a protected region such as kernel space 202 of FIG. 2. In the example shown in FIG. 4, the second memory region starts at physical address 0xA7a720 414. The instructions 408a of the identified function do_fsync( ) are loaded to the second memory region, shown in FIG. 4 as instructions 408b, starting at physical address 0xA7a720 414 by properly resolving the symbols and performing loader/linker specific operations. In the Linux kernel this can be achieved by using the existing live patching infrastructure. Note that directly copying the instructions to new physical memory will not always work because there can be loader resolved relative branches (e.g., the one at 0xc00000000037a7b4).

At block 308 of FIG. 3, the first instruction 412 of the kernel function at the first physical address 0x37a720 is patched to branch to the second physical address 0xA7a720 414 at the second memory location. In accordance with one or more embodiments of the present invention, the virtual address of the new physical location is calculated. In the case of Linux kernel on Power architecture as shown in FIG. 4, the virtual address is 0xc000000000A7a720. For other architectures and operating systems this may lead to a different virtual address.

As shown in FIG. 4, the first instruction 412 of the do_fsync( ) function is replaced with the branch instruction "b 0xc000000000A7a720." Subsequent to the replacing, whenever function do_fsync( ) is called, the control will branch to 0xc000000000A7a720, which corresponds to physical address 0xA7a720 414 containing the first instruction of the do_fsync( ) function. In this manner, the physical memory location in error 0x37a770 410 is never accessed and thus there is no risk of a system crash due to an UE at physical address 0x37a770 410.

In accordance with one or more embodiments of the present invention, the location of function do_fsync( ) can be permanently changed to a new physical address during a future reboot of the system. In addition, the memory space previously used by the do_fsync( ) function can be released for reuse.

Figure 5:
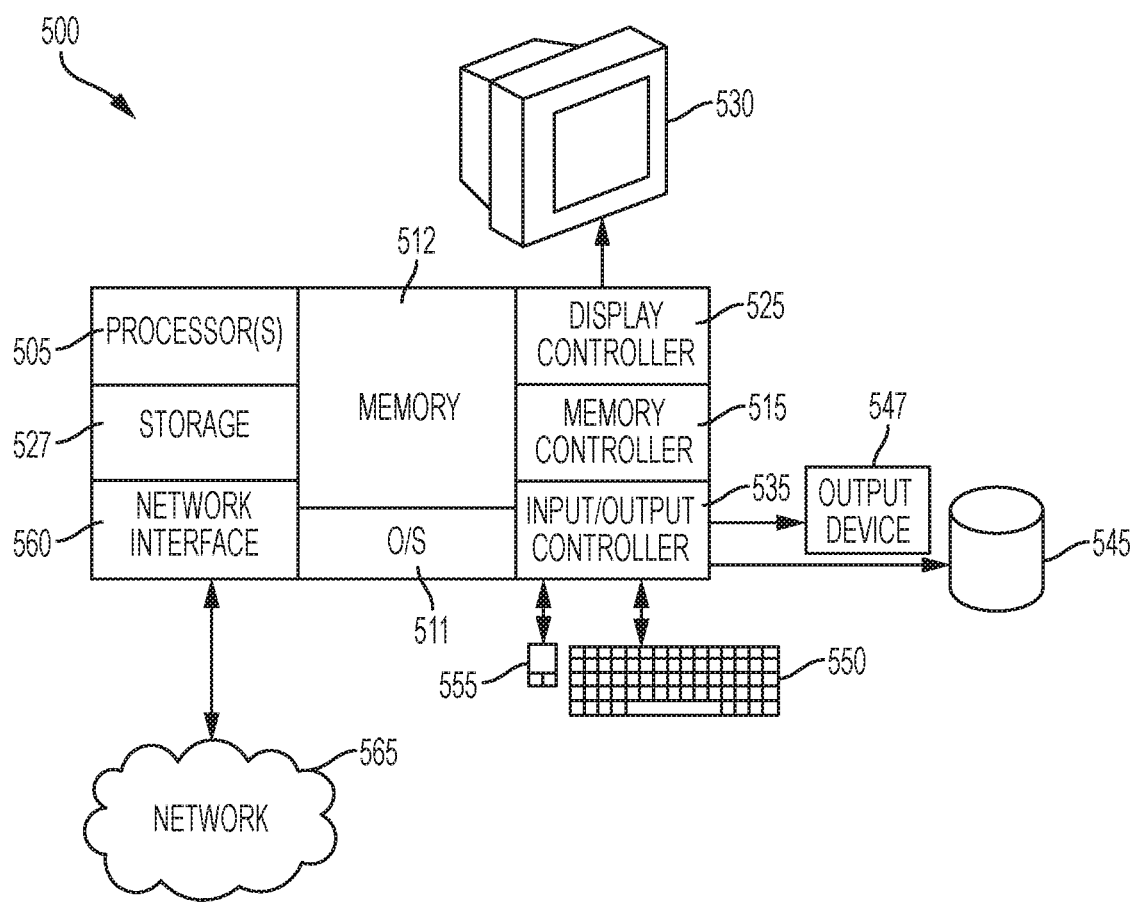
FIG. 5 is a block diagram of a computer system for implementing some or all aspects of a method for handling corrected memory errors on kernel text in accordance with one or more embodiments of the present invention.

Turning now to FIG. 5, a block diagram of a computer system for implementing some or all aspects of handling corrected memory errors on kernel text is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a mobile device, personal computer, workstation, minicomputer, or mainframe computer.

In an exemplary embodiment, as shown in FIG. 5, the computer system 500 includes a processor 505, memory 512 coupled to a memory controller 515, and one or more input devices 545 and/or output devices 547, such as peripherals, that are communicatively coupled via a local I/O controller 535. These devices 547 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 547, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 512. The processor 505 may be a custom made or commercially available processor, a central processing unit (CPU), an auxiliary processor among several processors associated with the computer system 500, a semiconductor based microprocessor (in the form of a microchip or chip set), a microprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 512 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 512 may incorporate electronic, magnetic, optical, or other types of storage media. Note that the memory 512 may have a distributed architecture, where various components are situated remote from one another but may be accessed by the processor 505.

The instructions in memory 512 may include one or more separate programs, each of which comprises an ordered listing of executable instructions for implementing logical functions. In the example of FIG. 5, the instructions in the memory 512 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 527, which may be a storage device such as a hard disk drive or solid state drive. The stored instructions in memory 512 or in storage 527 may include those enabling the processor to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for handling corrected memory errors on kernel text as described herein can be embodied, in whole or in part, in computer program products or in computer systems 500, such as that illustrated in FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying a correctable error (CE) in a physical error location of a memory;
identifying a kernel function impacted by the CE, the identified kernel function comprising a plurality of instructions in a first region of the memory, the plurality of instructions including a first instruction of the identified kernel function at a first physical memory location in the first region of the memory, the first region including the physical error location, wherein the first physical memory location is different than the physical error location;

loading the plurality of instructions to a second region of the memory, the loading including storing the first instruction of the identified kernel function at a second physical memory location in the second region of the memory;

updating the first physical memory location in the first region of the memory to include an instruction to branch to the second physical memory location in the second region of the memory;

receiving a request to access the identified kernel function at the first physical memory location subsequent to the loading and the updating; and accessing the first physical memory location and performing the instruction to branch to the second physical memory location in response to receiving the request to access the identified kernel function at the first physical memory location.

2. The computer-implemented method of claim 1, wherein the identifying a kernel function, loading and updating are performed by a kernel of a processor.

3. The computer-implemented method of claim 2, wherein the kernel is a hypervisor.

4. The computer-implemented method of claim 2, wherein the kernel is implemented by firmware.

5. The computer-implemented method of claim 1, wherein the identifying a CE comprises receiving a notification from a memory controller.

6. The computer-implemented method of claim 1, wherein the identifying a CE comprises receiving a notification from a processor.

7. The computer-implemented method of claim 1, wherein the first region of the memory and the second region of the memory comprise protected memory.

8. A system comprising:
a memory having computer readable instructions; and
one or more processors for executing the computer readable instructions, the computer readable instructions controlling the one or more processors to perform operations comprising:
identifying a correctable error (CE) in a physical error location of a memory;
identifying a kernel function impacted by the CE, the identified kernel function comprising a plurality of instructions in a first region of the memory, the plurality of instructions including a first instruction of the identified kernel function at a first physical memory location in the first region of the memory, the first region including the physical error location, wherein the first physical memory location is different than the physical error location;
loading the plurality of instructions to a second region of the memory, the loading including storing the first instruction of the identified kernel function at a second physical memory location in the second region of the memory;
updating the first physical memory location in the first region of the memory to include an instruction to branch to the second physical memory location in the second region of the memory;
receiving a request to access the identified kernel function at the first physical memory location subsequent to the loading and the updating; and
accessing the first physical memory location and performing the instruction to branch to the second physical memory location in response to receiving the request to access the identified kernel function at the first physical memory location.

9. The system of claim 8, wherein the identifying a kernel function, loading and updating are performed by a kernel of one of the one or more processors.

10. The system of claim 9, wherein the kernel is a hypervisor.

11. The system of claim 9, wherein the kernel is implemented by firmware.

12. The system of claim 8, wherein the identifying a kernel function, loading, and updating are performed by an operating system of one of the one or more processors.

13. The system of claim 8, wherein the identifying a CE comprises receiving a notification from a memory controller.

14. The system of claim 8, wherein the identifying a CE comprises receiving a notification from one of the one or more processors.

15. The system of claim 8, wherein the first region of the memory and the second region of the memory comprise protected memory.

16. A computer program product comprising a non-transitory computer readable storage medium having program instructions embodied therewith, the program instructions executable by a processor to cause the processor to perform operations comprising:
identifying a correctable error (CE) in a physical error location of a memory;
identifying a kernel function impacted by the CE, the identified kernel function comprising a plurality of instructions in a first region of the memory, the plurality of instructions including a first instruction of the identified kernel function at a first physical memory location in the first region of the memory, the first region including the physical error location, wherein the first physical memory location is different than the physical error location;
loading the plurality of instructions to a second region of the memory, the loading including storing the first instruction of the identified kernel function at a second physical memory location in the second region of the memory;
updating the first physical memory location in the first region of the memory to include an instruction to branch to the second physical memory location in the second region of the memory;
receiving a request to access the identified kernel function at the first physical memory location subsequent to the loading and the updating; and
accessing the first physical memory location and performing the instruction to branch to the second physical memory location in response to receiving the request to access the identified kernel function at the first physical memory location.

17. The computer program product of claim 16, wherein the identifying a kernel function, loading and updating are performed by a kernel.

18. The computer program product of claim 17, wherein the kernel is a hypervisor.

19. The computer program product of claim 16, wherein the first region of the memory and the second region of the memory comprise protected memory.

* * * * *